US012793893B2

(12) United States Patent
Hayakawa et al.

(10) Patent No.: US 12,793,893 B2
(45) Date of Patent: Nov. 10, 2026

(54) ELECTRONIC COMPONENT WITH INTERNAL ELECTRODES FORMING CAPACITOR PORTIONS

(71) Applicant: TDK CORPORATION, Tokyo (JP)

(72) Inventors: Naoki Hayakawa, Tokyo (JP); Yoshitaka Nagashima, Tokyo (JP); Yasuhiro Okui, Tokyo (JP); Shinya Saito, Tokyo (JP); Yasuo Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 428 days.

(21) Appl. No.: 18/465,613

(22) Filed: Sep. 12, 2023

(65) Prior Publication Data

US 2024/0112860 A1 Apr. 4, 2024

(30) Foreign Application Priority Data

Sep. 30, 2022 (JP) ................................ 2022-158448

(51) Int. Cl.
*H01G 4/30* (2006.01)
*H01G 4/005* (2006.01)
*H01G 4/232* (2006.01)

(52) U.S. Cl.
CPC ............. *H01G 4/005* (2013.01); *H01G 4/232* (2013.01); *H01G 4/30* (2013.01)

(58) Field of Classification Search
CPC .......... H01G 4/005; H01G 4/232; H01G 4/30; H01G 4/2325; H01G 2/065; H01G 4/012; H01G 4/38
See application file for complete search history.

(56) References Cited

U.S. PATENT DOCUMENTS 6,038,121 A * 3/2000 Naito ..................... H01G 4/232 361/308.1
8,355,241 B2 * 1/2013 Ogawa ..................... H01G 4/30 361/309

(Continued)

FOREIGN PATENT DOCUMENTS

JP 2004-095680 A 3/2004
JP 2006-086359 A 3/2006
JP 2019-046876 A 3/2019

OTHER PUBLICATIONS

Jan. 27, 2026 Office Action issued in Japanese Application No. P2022-158448.

*Primary Examiner* — Dion R. Ferguson
(74) *Attorney, Agent, or Firm* — Oliff PLC

(57) ABSTRACT

An electronic component includes: a first internal electrode which is provided inside an element body and is drawn on a first main surface corresponding to a mounting surface; a second internal electrode which is provided inside the element body, is provided at a position different from the first internal electrode when viewed from a third direction, and is drawn on the first main surface; a third internal electrode which is provided inside the element body, is provided at a position facing the first internal electrode and the second internal electrode in the third direction, and is drawn on the first main surface; wherein the first internal electrode and the third internal electrode face each other in the third direction to form a first capacitor portion, and wherein the second internal electrode and the third internal electrode face each other in the third direction to form a second capacitor portion.

12 Claims, 9 Drawing Sheets

(56) References Cited

U.S. PATENT DOCUMENTS

| | | | | |
|---|---|---|---|---|
| 9,460,855 | B2 * | 10/2016 | Lee | H01G 2/065 |
| 2004/0027735 | A1 * | 2/2004 | Hsieh | H01G 4/385 361/15 |
| 2004/0207972 | A1 * | 10/2004 | Kazama | H01G 4/38 361/321.2 |
| 2006/0158827 | A1 * | 7/2006 | Lee | H01G 4/30 361/311 |
| 2007/0070577 | A1 * | 3/2007 | Togashi | H01G 4/232 361/302 |
| 2008/0165469 | A1 * | 7/2008 | Lee | H01G 4/30 361/306.3 |
| 2009/0168298 | A1 * | 7/2009 | Togashi | H01G 4/232 361/306.3 |
| 2015/0090485 | A1 * | 4/2015 | Lee | H01G 2/065 361/301.4 |
| 2015/0325378 | A1 * | 11/2015 | Park | H03H 7/01 333/185 |
| 2015/0364260 | A1 * | 12/2015 | Lee | H01G 4/008 361/301.4 |
| 2016/0111214 | A1 * | 4/2016 | Park | H05K 1/0216 361/301.4 |
| 2017/0316882 | A1 * | 11/2017 | Park | H01G 4/012 |
| 2018/0020545 | A1 | 1/2018 | Ahn | |
| 2018/0226191 | A1 | 8/2018 | Yoshida et al. | |
| 2019/0189344 | A1 | 6/2019 | Yoshida et al. | |
| 2020/0343051 | A1 * | 10/2020 | Kirk | H01G 4/232 |
| 2024/0112860 | A1 * | 4/2024 | Hayakawa | H01G 4/005 |
| 2024/0112863 | A1 * | 4/2024 | Watanabe | H01G 4/012 |

* cited by examiner

ELECTRONIC COMPONENT WITH INTERNAL ELECTRODES FORMING CAPACITOR PORTIONS

CROSS REFERENCE TO RELATED APPLICATIONS

This application claims priority to Japanese Patent Application No. 2022-158448 filed on Sep. 30, 2022, the entire contents of which are incorporated by reference herein.

TECHNICAL FIELD

The present disclosure relates to an electronic component.

BACKGROUND

As a conventional electronic component, one described in Japanese Unexamined Patent Publication No. 2019-46876 is known. This electronic component includes an element body and a pair of terminal electrodes. An internal electrode is formed inside the element body to form two sets of capacitor portions. The internal electrodes are laminated in a direction orthogonal to a mounting surface. The pair of terminal electrodes are respectively formed on a pair of end surfaces facing each other in a direction parallel to the mounting surface.

SUMMARY

Here, there has been a demand for improving the performance of an electronic component including a plurality of capacitor portions connected in series inside an element body.

The present disclosure has been made to solve such problems and an object thereof is to provide an electronic component capable of improving performance and including a plurality of capacitor portions connected in series to each other.

An electronic component according to the present disclosure includes: an element body which has a first main surface and a second main surface facing each other in a first direction, a first end surface and a second end surface facing each other in a second direction orthogonal to the first direction, and a first side surface and a second side surface facing each other in a third direction orthogonal to the first direction and the second direction; a first internal electrode which is provided inside the element body and is drawn on the first main surface corresponding to a mounting surface; a second internal electrode which is provided inside the element body, is provided at a position different from the first internal electrode when viewed from the third direction, and is drawn on the first main surface; a first terminal electrode which is formed on the first main surface and is connected to the first internal electrode; a second terminal electrode which is formed on the first end surface and is connected to the second internal electrode; a third internal electrode which is provided inside the element body, is provided at a position facing the first internal electrode and the second internal electrode in the third direction, and is drawn on the first main surface; and a first external conductor which is formed on the first main surface and is connected to the third internal electrode, wherein the first internal electrode and the third internal electrode face each other in the third direction to form a first capacitor portion, and wherein the second internal electrode and the third internal electrode face each other in the third direction to form a second capacitor portion.

In this electronic component, the first capacitor portion and the second capacitor portion are connected in series to each other via at least the third internal electrode. By connecting the plurality of capacitor portions in series in this way, a short-circuit failure can be reduced. Further, the third internal electrode is connected to the first external conductor. Therefore, it is possible to inspect the presence or absence of the short-circuit failure of the first capacitor portion and the second capacitor portion by performing measurement while connecting the terminal electrode and the external conductor. Further, since the internal electrodes are laminated in the third direction orthogonal to the mounting surface and the terminal electrode is formed on the first main surface of the mounting surface, ESL can be lowered. Further, since there is no variation due to the lamination position of the internal electrodes, the ESR on the high frequency side can be stabilized. As described above, it is possible to improve the performance of the electronic component including the plurality of capacitor portions connected in series to each other.

In the electronic component, a plurality of the first external conductors may be provided and the first terminal electrode and the second terminal electrode may be arranged between the plurality of first external conductors. In this case, since the distance between the first terminal electrode and the second terminal electrode can be shortened, it is possible to reduce the bending stress between the terminal electrodes when mounting the electronic component.

In the electronic component, a plurality of the first external conductors may be provided and the plurality of first external conductors may be arranged between the first terminal electrode and the second terminal electrode. In this case, it is possible to improve the bending and fixing strength between the terminal electrodes by also mounting the external conductor when mounting the electronic component.

At least one of the first internal electrode, the second internal electrode, and the third internal electrode may include a notch portion at a corner on the outside of the second direction on the side of the first main surface. In this case, since the notch portion avoids a crack even when a crack is generated in the vicinity of the corner of the element body, it is possible to prevent the crack from reaching the overlapping portion of the internal electrode forming the capacitor portion.

At least one of the first terminal electrode, the second terminal electrode, and the first external conductor may be disposed at a corner between the end surface and the first main surface of the element body. In this case, since the starting point of the crack can be kept away from the overlapping portion of the internal electrode, it is possible to prevent the crack from reaching the overlapping portion of the internal electrode even when the crack is generated in the vicinity of the corner of the element body.

The electronic component may further include: a second external conductor which is formed on the first main surface and is disposed on the outside of the second direction in relation to the first terminal electrode, the second terminal electrode, and the first external conductor. In this case, it is possible to improve the bending and fixing strength between the terminal electrodes by mounting the second external conductor when mounting the electronic component.

The electronic component may further include: a pair of the third internal electrodes; a pair of the first external conductors connected to the pair of third internal electrodes;

and a fourth internal electrode which is provided inside the element body and is provided at a position different from the first internal electrode and the second internal electrode when viewed from the third direction, wherein the first internal electrode and one third internal electrode face each other in the third direction to form the first capacitor portion, wherein the second internal electrode and the other third internal electrode face each other in the third direction to form the second capacitor portion, wherein the fourth internal electrode and one third internal electrode face each other in the third direction to form a third capacitor portion, and wherein the fourth internal electrode and the other third internal electrode face each other in the third direction to form a fourth capacitor portion. In this case, four capacitor portions can be connected in series via the third internal electrode and the fourth internal electrode.

The electronic component may further include a third external conductor which is connected to the fourth internal electrode. In this case, it is possible to inspect the presence or absence of the short-circuit failure of the third capacitor portion and the fourth capacitor portion by using the third external conductor.

The third external conductor may be formed on the first main surface. In this case, it is possible to improve the mounting strength by also mounting the third external conductor when mounting the electronic component.

The third external conductor may be formed on the second main surface. In this case, it is possible to ensure a long distance between the terminal electrodes or the external conductors formed on the first main surface.

According to the present disclosure, it is possible to provide an electronic component capable of improving performance and including a plurality of capacitor portions connected in series to each other.

DETAILED DESCRIPTION

Figure 1:
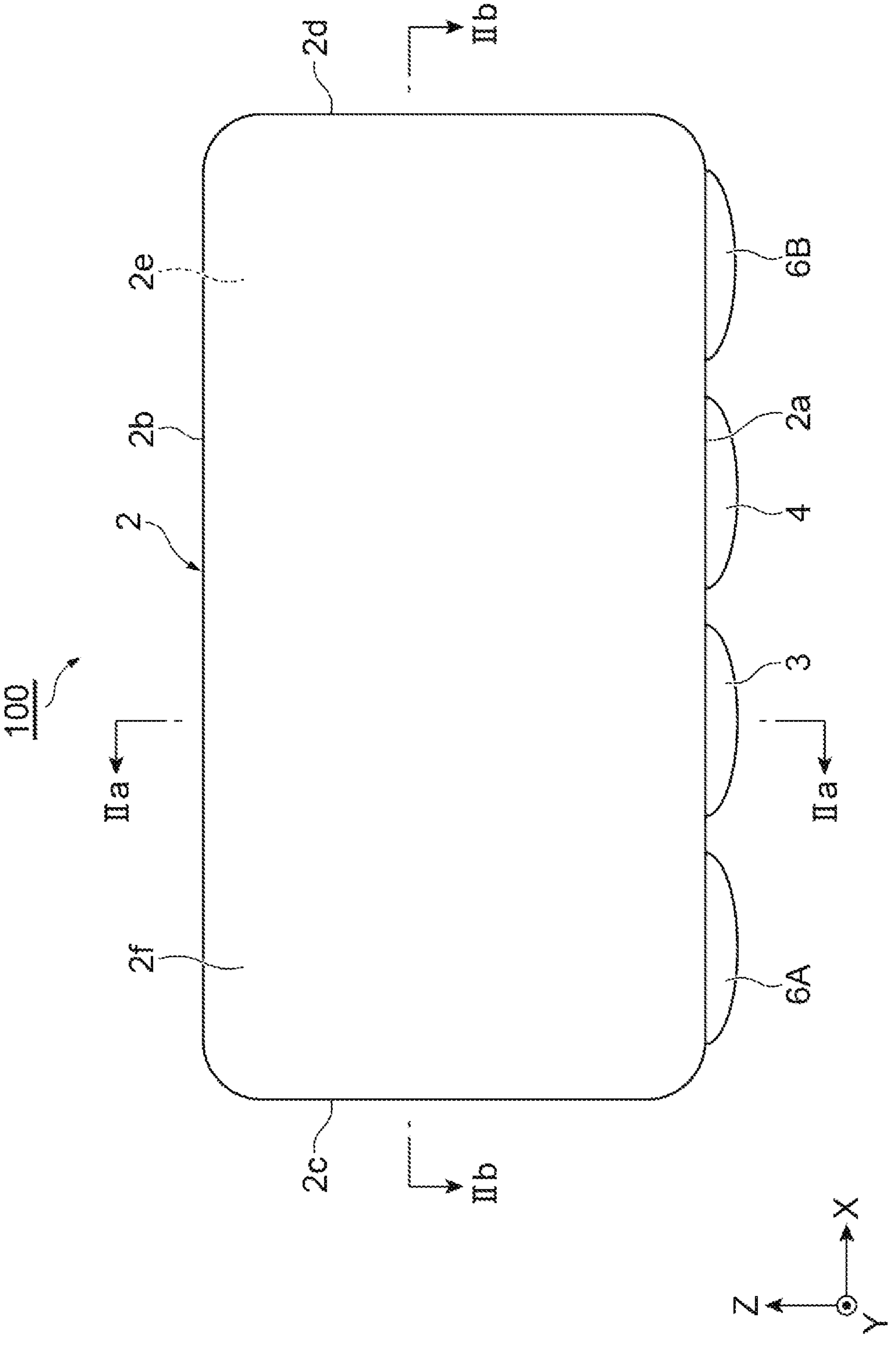
FIG. 1 is a front view of an electronic component according to an embodiment of the present disclosure.

Hereinafter, an embodiment of the present disclosure will be described in detail with reference to the accompanying drawings. In the description, the same reference numerals are used for the same elements or elements having the same function, and overlapping descriptions are omitted.

Figure 2A:
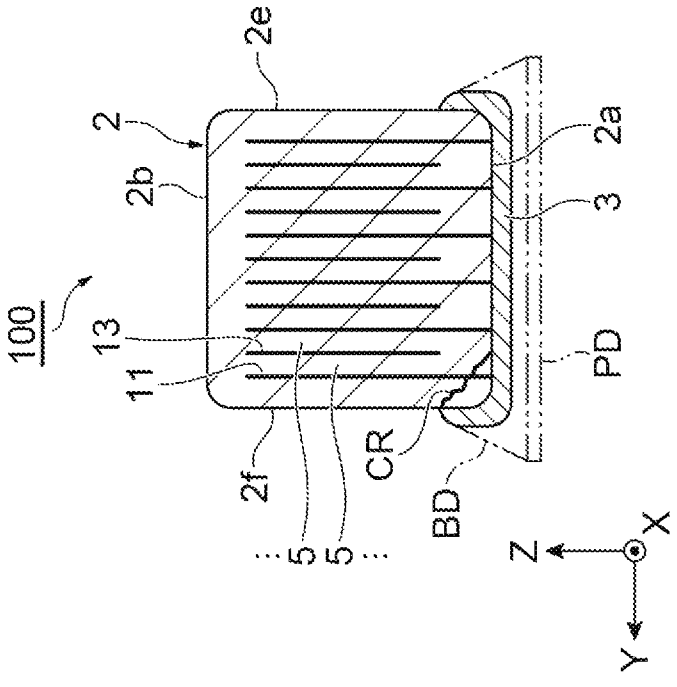
FIG. 2A is a cross-sectional view taken along a line IIA-IIA shown in FIG. 1
Figure 2B:
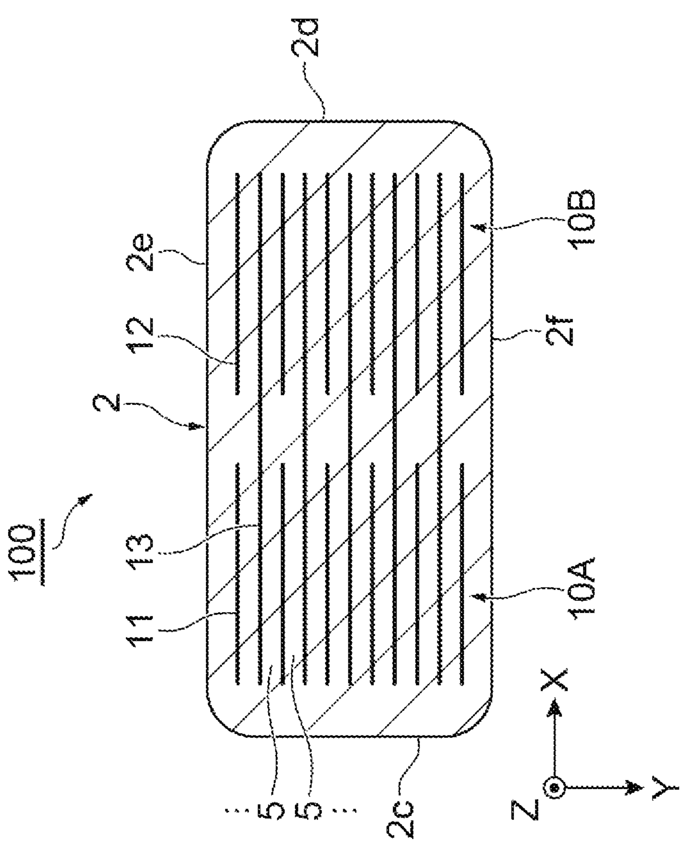
FIG. 2B is a cross-sectional view taken along a line IIB-IIB shown in FIG. 1.
Figure 3C:
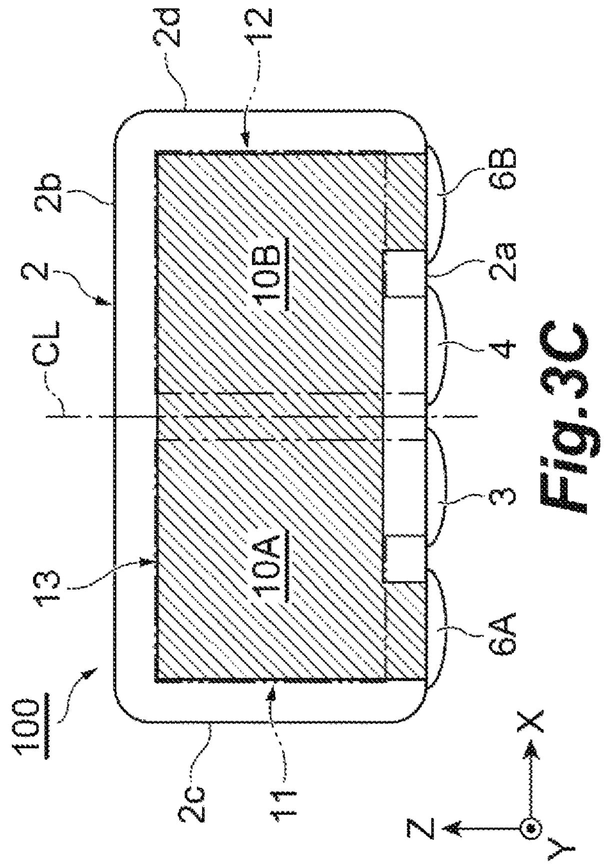
FIG. 3C is a diagram showing a state in which the first internal electrode and the second internal electrode overlap the third internal electrode.
Figure 3A:
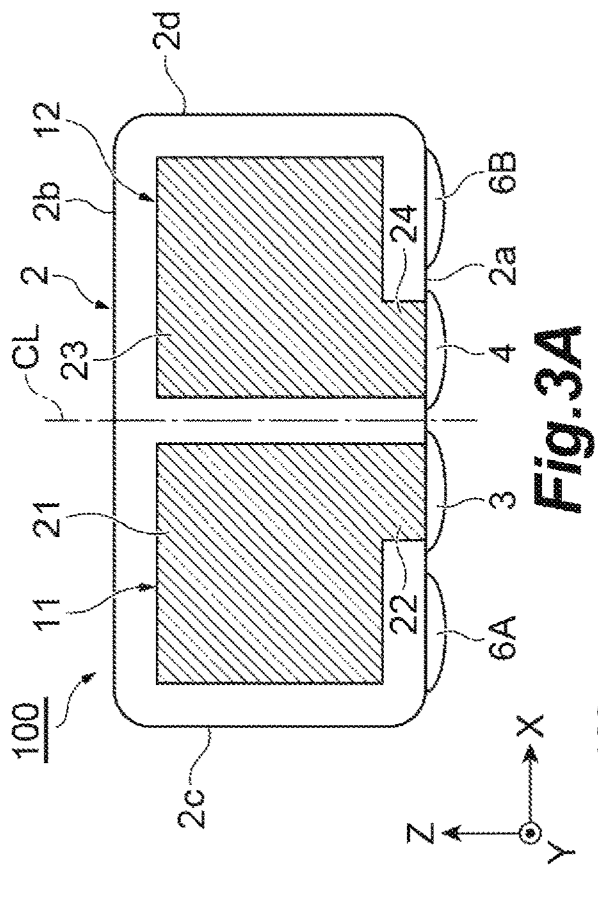
FIG. 3A is a diagram showing a first internal electrode and a second internal electrode.
Figure 3B:
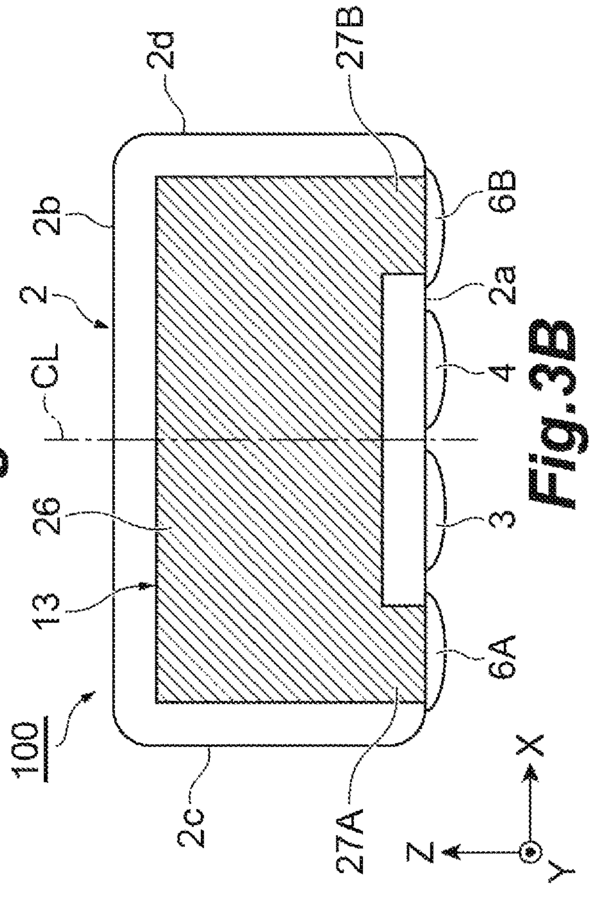
FIG. 3B is a diagram showing a third internal electrode.

First, a configuration of an electronic component 100 according to the embodiment will be described with reference to FIGS. 1 to 3A, 3B and 3C. FIG. 1 is a front view of an electronic component according to this embodiment. FIG. 2A is a cross-sectional view taken along a line IIA-IIA shown in FIG. 1 and FIG. 2B is a cross-sectional view taken along a line IIB-IIB shown in FIG. 1. FIG. 3A is a diagram showing a first internal electrode and a second internal electrode, FIG. 3B is a diagram showing a third internal electrode, and FIG. 3C is a diagram showing a state in which the first internal electrode and the second internal electrode overlap the third internal electrode. In FIG. 3C, the first internal electrode and the second internal electrode are indicated by virtual lines.

Additionally, in the description below, an XYZ coordinate system may be set for the electronic component 100 for explanation. The Z-axis direction (first direction) is a direction orthogonal to the lamination direction in which the internal electrodes to be described later are laminated. The Z-axis direction is a direction orthogonal to the surface of the circuit board to be mounted during mounting. The X-axis direction (second direction) is a direction orthogonal to the Z-axis direction and is a direction parallel to the surface of the circuit board during mounting. Further, the X-axis direction corresponds to a longitudinal direction in which an element body 2 extends. The Y-axis direction (third direction) is a direction orthogonal to the Z-axis direction and the X-axis direction and is a direction parallel to the surface of the circuit board during mounting and orthogonal to the X-axis direction. The Y-axis direction is a direction in which the internal electrodes to be described later are laminated. In FIG. 1, the upper side is the positive side of the Z-axis direction, and the lower side is the negative side of the Z-axis direction.

As shown in FIG. 1, the electronic component 100 includes the element body 2, a first terminal electrode 3, a second terminal electrode 4, and a pair of external conductors 6A and 6B. As shown in FIGS. 2A and 2B, the electronic component 100 includes a first internal electrode 11, a second internal electrode 12, and a third internal electrode 13 in the element body 2.

As shown in FIG. 1, the element body 2 is a rectangular parallelepiped component extending along the X-axis direction which is the longitudinal direction. The element body 2 includes a first main surface 2*a* and a second main surface 2*b* which face each other in the Z-axis direction, a first end surface 2*c* and a second end surface 2*d* which face each other in the X-axis direction, and a first side surface 2*e* and a second side surface 2*f* which face each other in the Y-axis direction. The first main surface 2*a* is disposed on the negative side of the Z-axis direction and the second main surface 2*b* is disposed on the positive side of the Z-axis direction. The first end surface 2*c* is disposed on the negative side of the X-axis direction and the second end surface 2*d* is disposed on the positive side of the X-axis direction. The first side surface 2*e* is disposed on the negative side of the Y-axis direction and the second side surface 2*f* is disposed on the positive side of the Y-axis direction. Among them, the first main surface 2*a* is a mounting surface facing a mounting substrate during mounting.

Although the shape of the element body 2 is not particularly limited, the element body has a rectangular parallelepiped shape in which the dimension in the X-axis direction is larger than the dimension in the Z-axis direction and the Y-axis direction. The rectangular parallelepiped shape includes a rectangular parallelepiped shape with chamfered corners and edges, and a rectangular parallelepiped shape with rounded corners and edges. For example, the length of the element body 2 in the X-axis direction may be 1.45 to 3.50 mm, the length in the Y-axis direction may be 0.7 to 1.85 mm, and the length of the Z-axis direction may be 0.7 to 1.85 mm.

The element body 2 is configured by laminating a plurality of dielectric layers (dielectric layers 5 shown in FIGS. 2A and 2B) in the Y-axis direction. Each dielectric layer is composed of, for example, a sintered body of a ceramic green sheet containing a dielectric material (a $BaTiO_3$-based, $Ba(Ti, Zr)O_3$-based, or $(Ba, Ca)TiO_3$-based dielectric ceramic). In the actual element body 2, the dielectric layers 5 are integrated to such an extent that the boundaries between the dielectric layers 5 cannot be visually recognized.

The terminal electrodes 3 and 4 are provided on the first main surface 2*a* of the element body 2. The terminal electrodes 3 and 4 are portions for electrically connecting other members and the electronic component 100 and functioning as effective terminals. The terminal electrodes 3 and 4 are formed at predetermined positions of the first main surface 2*a* in the X-axis direction to extend in the Y-axis direction (see FIG. 2A). The external conductors 6A and 6B are provided on the first main surface 2*a* of the element body 2. The first external conductors 6A and 6B improve the fixing strength with other members and function as terminals for electrical property measurement. The first external terminals 6A and 6B are formed at predetermined positions of the first main surface 2*a* in the X-axis direction to extend in the Y-axis direction. In this embodiment, the first external terminal 6A, the first terminal electrode, the second terminal electrode, and the first external terminal electrode 6B are provided in order from the negative side to the positive side of the X-axis direction. Accordingly, the first terminal electrode 3 and the second terminal electrode 4 are arranged between the plurality of first external conductors 6A and 6B.

As shown in FIGS. 2A and 2B, the internal electrodes 11, 12, and 13 are flat conductor patterns extending in parallel to the XZ plane. The plurality of internal electrodes 11, 12, and 13 are formed in the Y-axis direction. The first internal electrode 11 is provided in the region on the negative side of the X-axis direction inside the element body 2 and is connected to the first terminal electrode 3 in the first main surface 2*a*. The second internal electrode 12 is provided in the region on the positive side of the X-axis direction inside the element body 2 and is connected to the second terminal electrode 4 in the first main surface 2*a*. The second internal electrode 12 is provided at a position different from the first internal electrode 11 when viewed from the Y-axis direction. The first internal electrode 11 and the second internal electrode 12 are arranged in the same plane. That is, the first internal electrode 11 and the second internal electrode 12 are formed on the same dielectric layer 5 and are positioned at the same position in the Y-axis direction. Before lamination, conductor patterns of the first internal electrodes 11 and the second internal electrodes 12 are formed on the ceramic green sheets of the dielectric layer 5.

The third internal electrodes 13 are provided in both regions on the negative side and the positive side of the X-axis direction inside the element body 2 and are drawn out to the first main surface 2*a*. The third internal electrode 13 is disposed on the surface different from the internal electrodes 11 and 12. That is, the third internal electrode 13 is formed on the dielectric layer 5 different from those of the internal electrodes 11 and 12 and has a different position in the Z-axis direction. Before lamination, the conductor pattern of the third internal electrode 13 is formed on the ceramic green sheet of the dielectric layer 5.

An example of a specific shape of each of the internal electrodes 11, 12, and 13 will be described with reference to FIGS. 3A, 3B, and 3C. In the description below, a description may be given using the center line CL in the X-axis direction set for the element body 2. As shown in FIG. 3A, the first internal electrode 11 and the second internal electrode 12 are line-symmetrical with respect to the center line CL. The first internal electrode 11 is formed in the region on the negative side of the X-axis direction in relation to the center line CL. The first internal electrode 11 includes a main body portion 21 and a drawn portion 22. The main body portion 21 has a rectangular outer shape. Four edges of the main body portion 21 are arranged to be separated from the first main surface 2*a*, the second main surface 2*b*, the first end surface 2*c*, and the center line CL. The drawn portion 22 extends from the end portion on the inside (positive side) of the X-axis direction of the main body portion 21 toward the negative side of the Z-axis direction and is exposed on the first main surface 2*a* to be connected to the first terminal electrode 3.

The second internal electrode 12 is formed in the region on the positive side of the X-axis direction in relation to the center line CL. The second internal electrode 12 includes a main body portion 23 and a drawn portion 24. The main body portion 23 has a rectangular outer shape. Four edges of the main body portion 23 are arranged to be separated from the first main surface 2*a*, the second main surface 2*b*, the second end surface 2*d*, and the center line CL. The drawn portion 24 extends from the end portion on the inside (negative side) of the X-axis direction in the main body portion 23 toward the negative side of the Z-axis direction and is exposed on the first main surface 2*a* to be connected to the second terminal electrode 4. A gap is formed at a position including the center line CL between the first internal electrode 11 and the second internal electrode 12.

As shown in FIG. 3B, the third internal electrode 13 is line-symmetrical with respect to the center line CL. The third internal electrode 13 includes a main body portion 26 and a pair of drawn portions 27A and 27B. The main body portion 26 extends on both the negative side and the positive side of the X-axis direction with respect to the center line CL. The main body portion 26 has the same outer shape as the main body portion 21 of the first internal electrode 11 on the negative side of the X-axis direction when viewed from the Z-axis direction, has the same outer shape as the main body portion 23 of the second internal electrode 12 on the positive side of the X-axis direction, and has a shape in which a portion corresponding to the main body portion 21 is connected to a portion corresponding to the main body portion 23 (see FIG. 3C). Further, the main body portion 26 is disposed to face both the main body portions 21 and 23 in the Z-axis direction. The drawn portion 27A extends from the end portion on the outside (negative side) of the X-axis direction of the main body portion 26 toward the negative side of the Z-axis direction and is exposed on the first main surface 2*a* to be connected to the external conductor 6A. The drawn portion 27B extends from the end portion on the outside (positive side) of the X-axis direction of the main body portion 26 toward the negative side of the Z-axis direction and is exposed on the first main surface 2*a* to be connected to the external conductor 6B.

As described above, as shown in FIG. 2B, a first capacitor portion 10A is formed in the region on the negative side of the X-axis direction and a second capacitor portion 10B is formed in the region on the positive side of the X-axis direction inside the element body 2. The first capacitor portion 10A is configured by the first internal electrode 11 and the third internal electrode facing each other in the Y-axis direction. The first capacitor portion 10A is formed by alternately laminating the plurality of first internal electrodes 11 and the plurality of third internal electrodes 13. The second capacitor portion 10B is formed by alternately laminating the plurality of second internal electrodes 12 and the plurality of third internal electrodes 13. The second capacitor portion 10B is configured by the second internal electrode 12 and the third internal electrode facing each other in the Y-axis direction and the first capacitor portion 10A and the second capacitor portion 10B are connected in series to each other by the main body portion 26 of the third internal electrode.

As shown in FIGS. 2A and 2B, the first internal electrode 11 and the second internal electrode 12 are arranged on the outermost layer in the laminated internal electrodes. That is, among the internal electrodes arranged inside the element body 2, the first internal electrode 11 and the second internal electrode 12 are arranged on the most positive side of the Y-axis direction and the first internal electrode 11 and the second internal electrode 12 are arranged on the most negative side of the Y-axis direction.

Next, the operation and effect of the electronic component 100 according to this embodiment will be described.

In the electronic component 100, the first capacitor portion 10A and the second capacitor portion 10B are connected in series to each other via at least the third internal electrode 13. In this case, even when one of the capacitor portions 10A and 10B is damaged, the capacitor function of the other remains and hence a short-circuit failure can be reduced. By connecting the plurality of capacitor portions 10A and 10B in series in this way, a short-circuit failure can be reduced. Further, the third internal electrode 13 is connected to the first external conductors 6A and 6B. Therefore, it is possible to inspect the presence or absence of the short-circuit failure in the first capacitor portion 10A and the second capacitor portion 10B by performing measurement while connecting the terminal electrodes 3 and 4 to the external conductors 6A and 6B.

Figure 4:
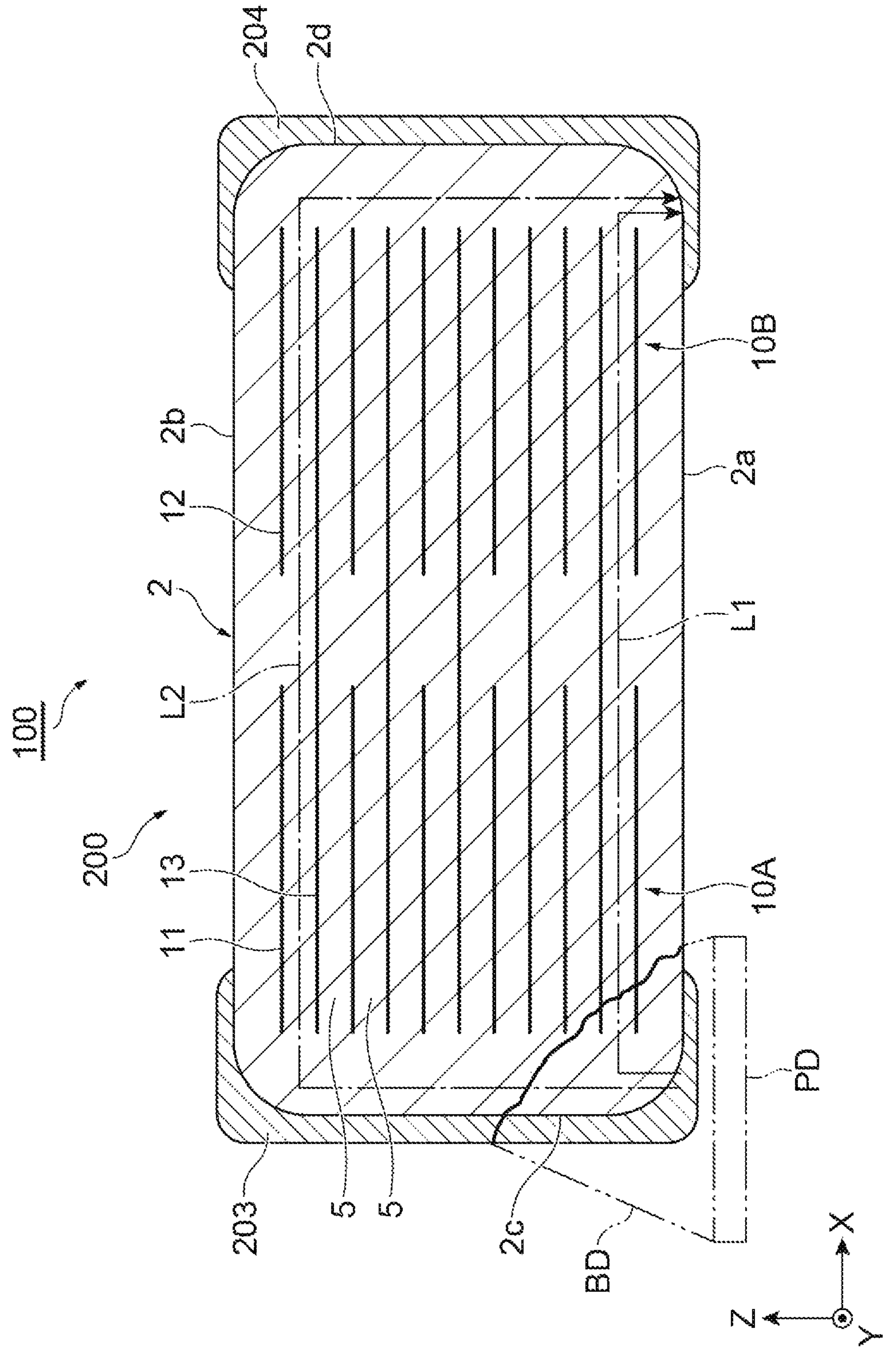
FIG. 4 is a cross-sectional view showing an electronic component according to a comparative example.

Here, an electronic component 200 according to a comparative example will be described with reference to FIG. 4. In the electronic component 200 according to the comparative example, the internal electrodes are laminated in the Z-axis direction perpendicular to the mounting surface and terminal electrodes 203 and 204 are formed on the end surfaces 2*c* and 2*d* perpendicular to the mounting surface. At this time, since a path L1 of a current passing through the internal electrode on the negative side of the Z-axis direction as the lamination direction and a path L2 of a current passing through the internal electrode on the positive side thereof not form an equivalent circuit when the electronic component 200 is mounted on the substrate with the first main surface 2*a* as the mounting surface, ESR on the high frequency side of the electronic component 200 becomes unstable. Further, since a solder portion BD extends to a high position in the Z-axis direction when the terminal electrode 203 is connected to a substrate side electrode PD via the solder portion BD, there is a possibility that a crack CR generated by the bending stress becomes large and reaches the overlapping portion of the internal electrodes 11 and 13 in the capacitor portion 10A.

On the other hand, in the electronic component 100 according to this embodiment, since the internal electrodes are laminated in the Y-axis direction orthogonal to the mounting surface and the terminal electrodes 3 and 4 are formed on the first main surface 2*a* which is the mounting surface, ESL can be lowered. Further, since there is no variation due to the lamination position of the internal electrodes, the ESR on the high frequency side can be stabilized. As described above, it is possible to improve the performance of the electronic component 100 including the plurality of capacitor portions 10A and 10B connected in series to each other.

Further, since the terminal electrodes 3 and 4 are formed on the first main surface 2*a* which is the mounting surface, it is not necessary to raise the solder portion BD greatly in the Z-axis direction when connecting the first terminal electrode 3 to the substrate side electrode PD via the solder portion BD. Therefore, it is possible to prevent the crack CR from reaching the overlapping portion of the internal electrodes 11 and 13 (see FIG. 2A). Further, in the electronic component 200 according to the comparative example, since the terminal electrodes 203 and 204 are formed on the end surfaces 2*c* and 2*d*, the dimension in the X-axis direction increases and the mounting area increases. On the other hand, the electronic component 100 of this embodiment can reduce the mounting area by forming the terminal electrodes 3 and 4 on the mounting surface.

The electronic component 100 includes the plurality of first external conductors 6A and 6B and the first terminal electrode 3 and the second terminal electrode 4 are arranged between the plurality of first external conductors 6A and 6B. In this case, since the distance between the first terminal electrode 3 and the second terminal electrode 4 can be shortened, it is possible to reduce the bending stress between the terminal electrodes 3 and 4 when mounting the electronic component 100. For example, in the electronic component 200 according to the comparative example shown in FIG. 4, since the terminal electrode 3 and the terminal electrode 4 are formed at both end portions in the X-axis direction, the dimension between both terminal electrodes is large. Therefore, the stress when the terminal electrodes 3 and 4 are bent increases.

The present disclosure is not limited to the above-described embodiment.

The structure of the internal electrode of the electronic component 100 is not limited to the above-described embodiment. For example, a structure shown in FIGS. 5A and 5B may be adopted. The electronic component 100 shown in FIGS. 5A and 5B includes the plurality of first external conductors 6A and 6B and the plurality of first external conductors 6A and 6B may be arranged between the first terminal electrode 3 and the second terminal electrode 4. In this case, it is possible to improve the bending and fixing strength between the terminal electrodes 3 and 4 by also mounting the first external conductors 6A and 6B when mounting the electronic component 100.

Figure 5C:
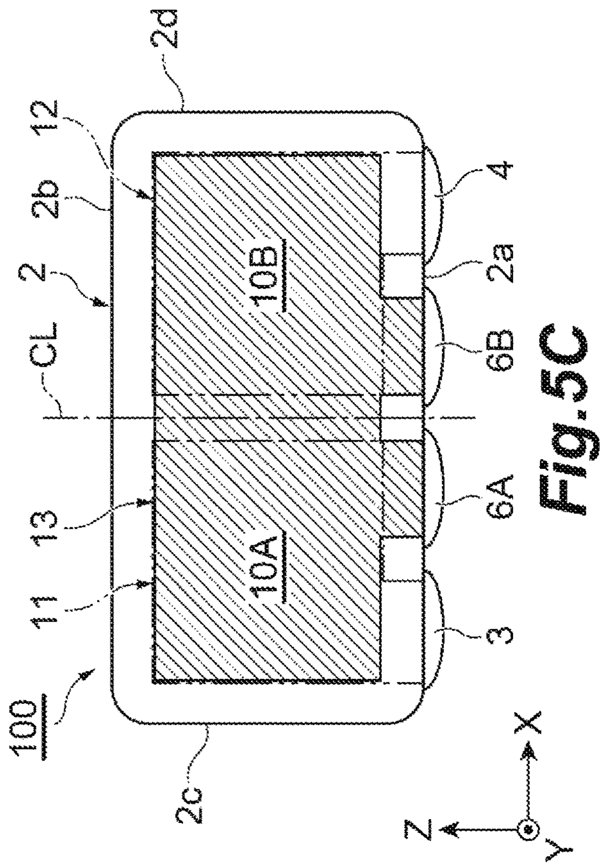
FIG. 5A, FIG. 5B, and FIG. 5C are diagrams showing an electronic component according to a modified example.
Figure 5A:
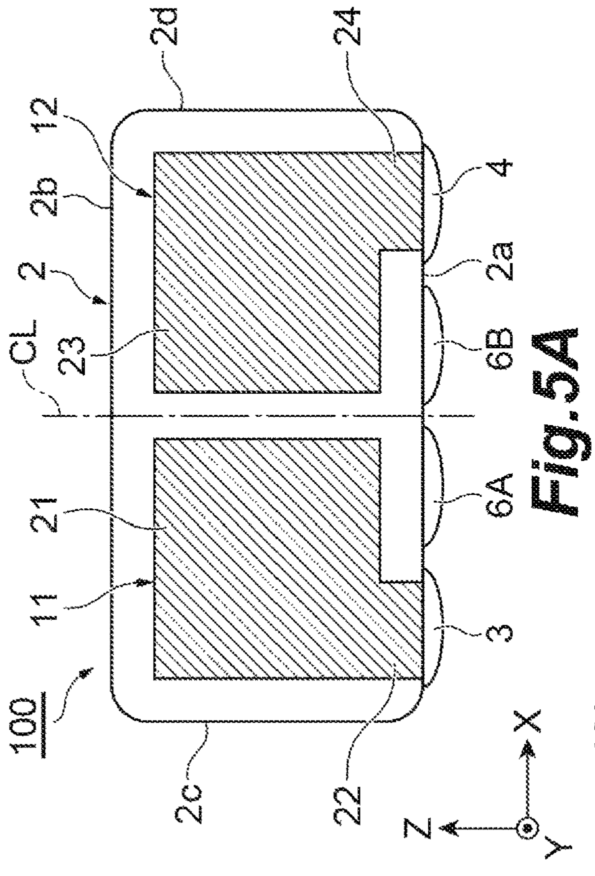
Figure 5B:
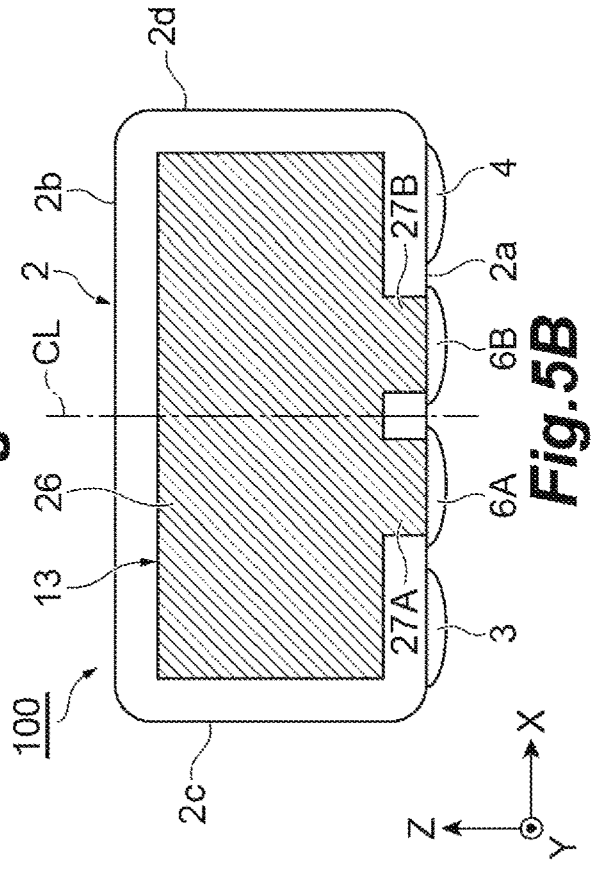

Specifically, as shown in FIG. 5A, the first terminal electrode 3, the first external conductor 6A, the first external conductor 6B, and the second terminal electrode 4 are provided in this order from the negative side to the positive side of the X-axis direction. The drawn portion 22 of the first internal electrode 11 is provided at the end portion on the negative side of the X-axis direction in the main body portion 21. The drawn portion 24 of the second internal electrode 12 is provided at the end portion on the positive side of the X-axis direction of the main body portion 23. Further, as shown in FIG. 5B, the drawn portions 6A and 6B are provided near the center line CL of the third internal electrode 13.

Figure 6B:
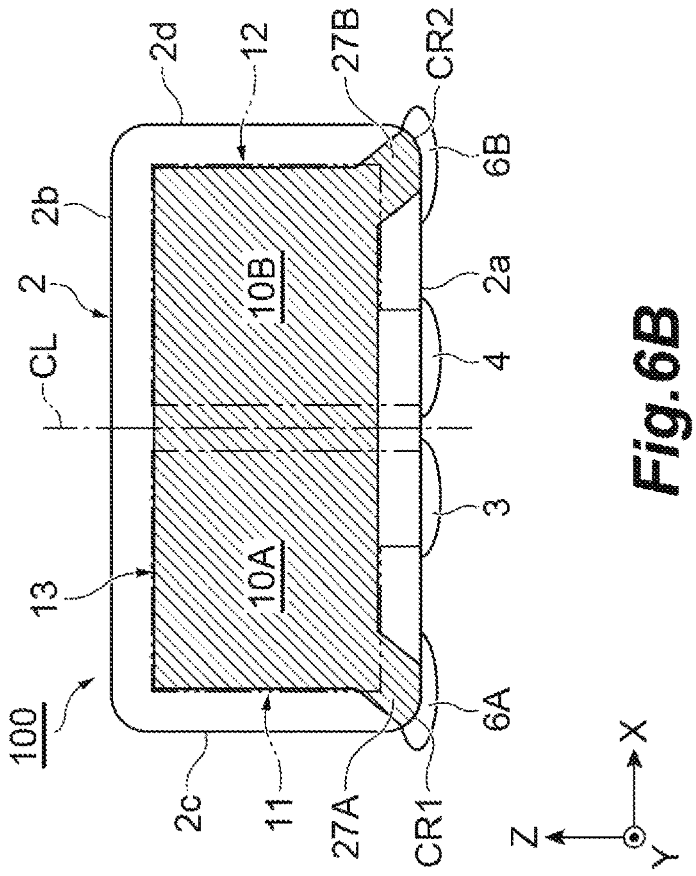
FIG. 6A and FIG. 6B are diagrams showing electronic components according to modified examples.
Figure 6A:
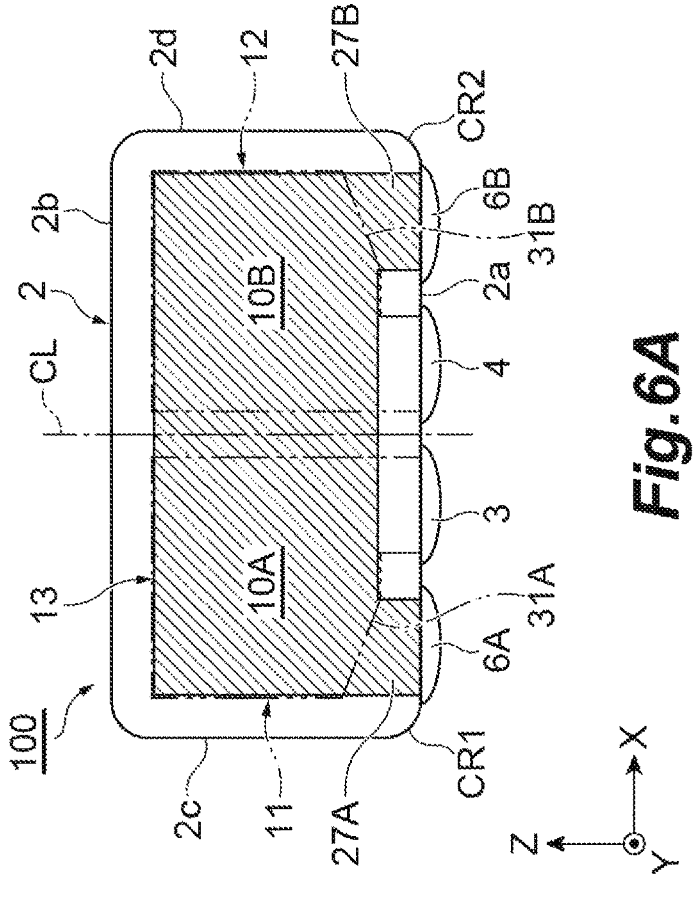

Further, as shown in FIG. 6A, the main body portion 21 of the first internal electrode 11 may include a notch portion 31A at a corner on the outside (negative side) of the X-axis direction on the side of the first main surface 2*a* and the main body portion 23 of the second internal electrode 12 may include a notch portion 31B at a corner on the outside (positive side) of the X-axis direction on the side of the first main surface 2*a*. In this case, since the notch portions 31A and 31B avoid a crack even when a crack is generated in the vicinity of corners CR1 and CR2 of the element body 2, it is possible to prevent the crack from reaching the overlapping portion of the internal electrode forming the capacitor portions 10A and 10B. Additionally, the configuration of the notch portion shown in FIG. 6A may be applied to the configuration of FIGS. 5A and 5B. In this case, the corner on the side of the first main surface 2*a* of the main body portion 26 of the third internal electrode 13 includes a notch portion.

Further, as shown in FIG. 6B, the first external conductors 6A and 6B may be arranged at the corners CR1 and CR2 between the first main surface 2*a* and the end surfaces 2*c* and 2*d* of the element body 2. In this case, since the first external conductors 6A and 6B corresponding to the starting point of the crack can be kept away from the overlapping portion of the internal electrode, it is possible to prevent the crack from reaching the overlapping portion of the internal electrode even when the crack is generated in the vicinity of the corners CR1 and CR2 of the element body 2. In this case, the drawn portions 27A and 27B of the third internal electrode 13 extend obliquely toward the corners CR1 and CR2. Additionally, the configuration shown in FIG. 6B may be applied to the configuration of FIGS. 5A and 5B. In this case, the first terminal electrode 3 and the second terminal electrode 4 are arranged at the corners CR1 and CR2 and the drawn portions 22 and 24 extend obliquely toward the corners CR1 and CR2.

Figure 7A:
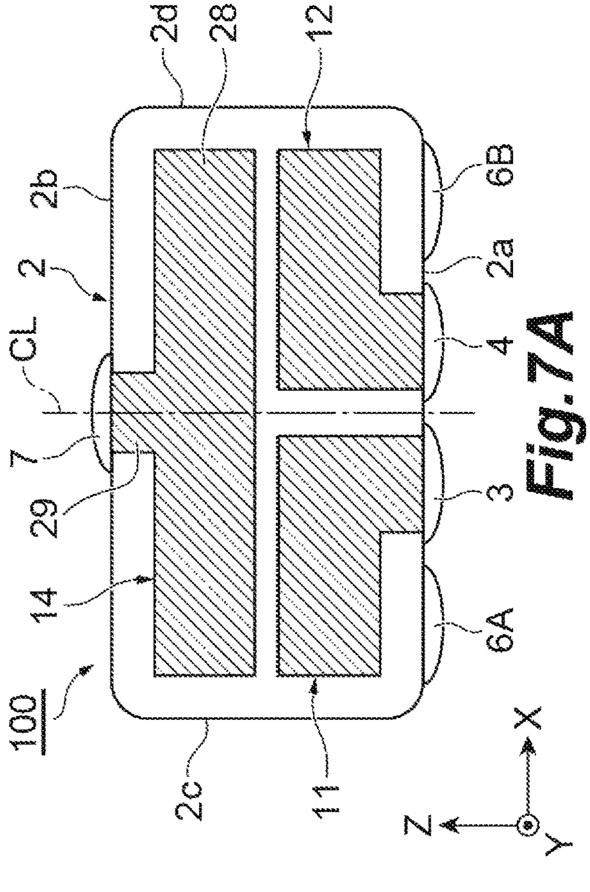
FIG. 7A, FIG. 7B, and FIG. 7C are diagrams showing an electronic component according to a modified example.
Figure 7B:
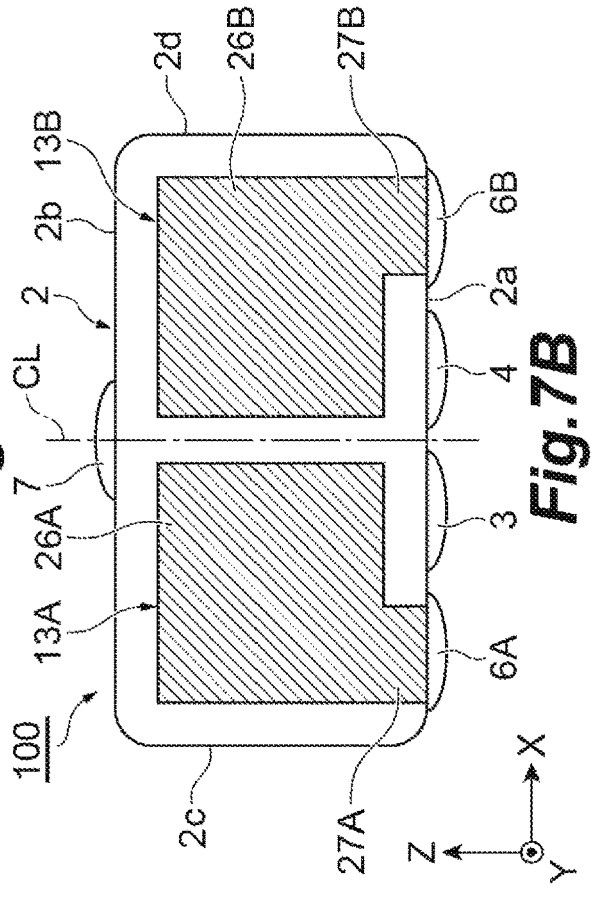
Figure 7C:
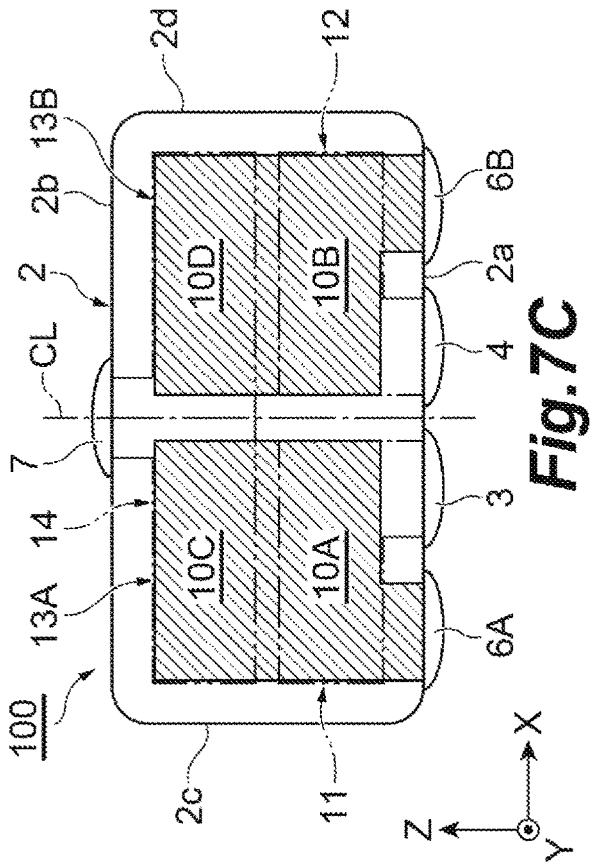

For example, a structure shown in FIGS. 7A, 7B and 7C may be adopted. As shown in FIGS. 7A, 7B and 7C, the electronic component 100 includes a pair of third internal electrodes 13A and 13B, the pair of first external conductors 6A and 6B connected to the pair of third internal electrodes 13A and 13B, and a fourth internal electrode 14 provided inside the element body 2 and provided at a position different from those of the first internal electrode 11 and the second internal electrode 12 when viewed from the Y-axis direction. As shown in FIG. 7C, the first internal electrode 11 and one third internal electrode 13A may face each other in the Y-axis direction to form the first capacitor portion 10A, the second internal electrode 12 and the other third internal electrode 13B may face each other in the Y-axis direction to form the second capacitor portion 10B, the fourth internal electrode 14 and one third internal electrode 13A may face each other in the Y-axis direction to form a third capacitor portion 10C, and the fourth internal electrode 14 and the other third internal electrode 13 may face each other in the Y-axis direction to form a fourth capacitor portion 10D. In this case, four capacitor portions 10A, 10C, 10D, and 10B can be connected in series via the third internal electrodes 13A and 13B and the fourth internal electrode 14.

As shown in FIG. 7A, the fourth internal electrode 14 is provided at a position separated to the positive side of the Z-axis direction in relation to the first internal electrode 11 and the second internal electrode 12. The fourth internal electrode 14 includes a rectangular main body portion 28 and a drawn portion 29. The main body portion 28 is formed to extend toward both the positive and negative sides of the X-axis direction with respect to the center line CL. The drawn portion 29 is drawn from the main body portion 28 toward the positive side of the Z-axis direction and is exposed on the second main surface 2*b*. The drawn portion 29 is connected to a third external conductor 7 formed on the second main surface 2*b*.

As shown in FIG. 7B, the pair of third internal electrodes 13A and 13B are formed by dividing one internal electrode 13 shown in FIG. 3B at the position of the center line CL. One third internal electrode 13A is formed in the region on the negative side of the X-axis direction in relation to the center line CL. A main body portion 26A of one third internal electrode 13A faces the first internal electrode 11 in the region on the negative side of the Z-axis direction and faces the fourth internal electrode 14 in the region on the positive side of the Z-axis direction. The other third internal electrode 13B is formed in the region on the positive side of the X-axis direction in relation to the center line CL. A main body portion 26B of the other third internal electrode 13B faces the second internal electrode 12 in the region on the negative side of the Z-axis direction and faces the fourth internal electrode 14 in the region on the positive side of the Z-axis direction.

As described above, the electronic component 100 may include the third external conductor 7 which is connected to the fourth internal electrode 14. In this case, it is possible to inspect the presence or absence of the short-circuit failure of the third capacitor portion 10C and the fourth capacitor portion 10D using the third external conductor 7.

The third external conductor 7 may be formed on the second main surface 2*b*. In this case, it is possible to ensure a long distance between the terminal electrodes 3 and 4 or the external conductors 6A and 6B formed on the first main surface 2*a*.

Figure 8C:
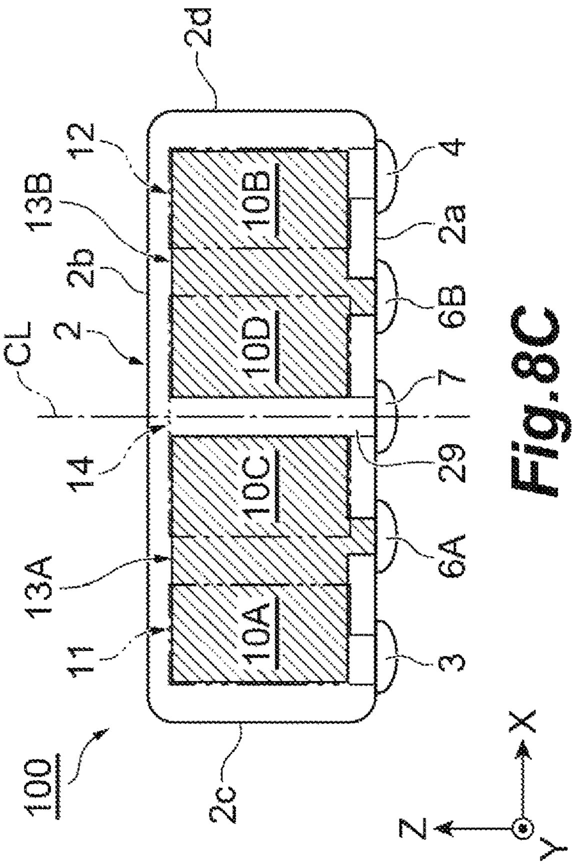
FIG. 8A, FIG. 8B and FIG. 8C are diagrams showing an electronic component according to a modified example.
Figure 8A:
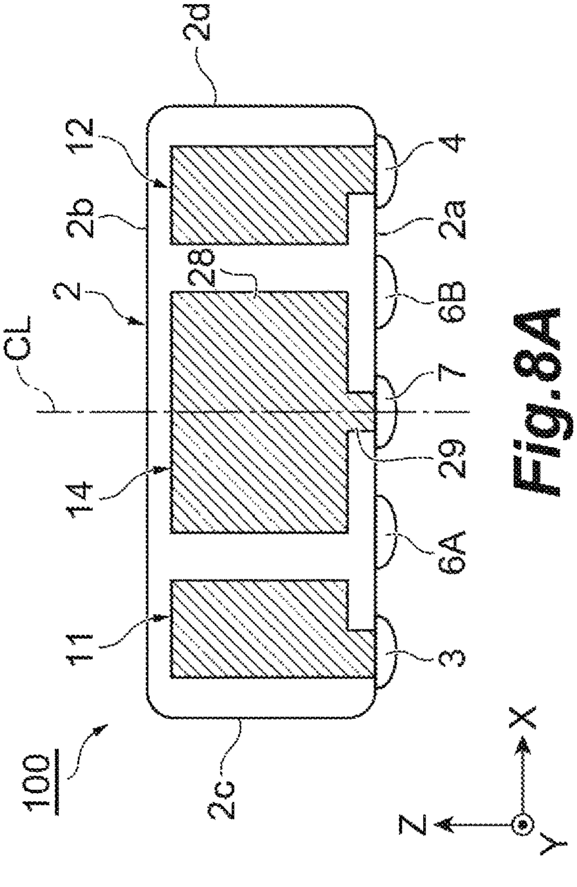
Figure 8B:
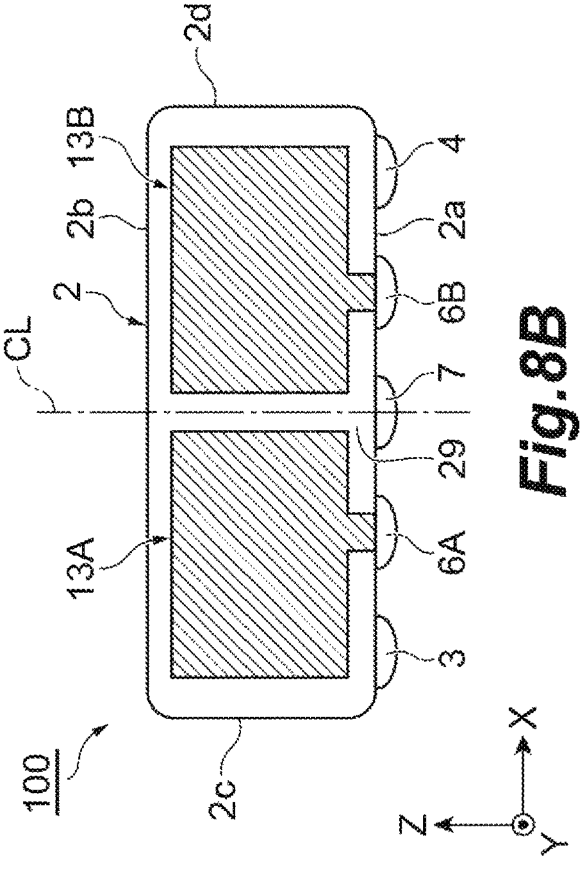

Further, a configuration shown in FIGS. 8A, 8B and 8C may be adopted instead of FIGS. 7A, 7B and 7C. As shown in FIG. 8A, the fourth internal electrode 14 of the electronic component 100 is disposed between the first internal electrode 11 and the second internal electrode 12 in the X-axis direction. Further, the drawn portion 29 of the fourth internal electrode 14 extends from the main body portion 28 toward the negative side of the Z-axis direction. The first terminal electrode 3, the first external conductor 6A, the second external conductor 7, the first external conductor 6B, and the second terminal electrode 4 are formed on the first main surface 2*a* in order from the negative side to the positive side of the X-axis direction. The fourth internal electrode 14 is connected to the second external conductor 7 on the side of the first main surface 2*a*.

As shown in FIG. 8C, one third internal electrode 13A faces the first internal electrode 11 in the vicinity of the edge on the negative side of the X-axis direction to form the first capacitor portion 10A. One third internal electrode 13A faces the fourth internal electrode 14 in the vicinity of the edge on the positive side of the X-axis direction to form the third capacitor portion 10C. The other third internal electrode 13B faces the fourth internal electrode 14 in the vicinity of the edge on the negative side of the X-axis direction to form the fourth capacitor portion 10D. The other third internal electrode 13B faces the second internal electrode 12 in the vicinity of the edge on the positive side of the X-axis direction to form the second capacitor portion 10B.

The third external conductor 7 may be formed on the first main surface 2*a*. In this case, it is possible to improve the mounting strength by also mounting the third external conductor 7 when mounting the electronic component 100.

Figure 9A:
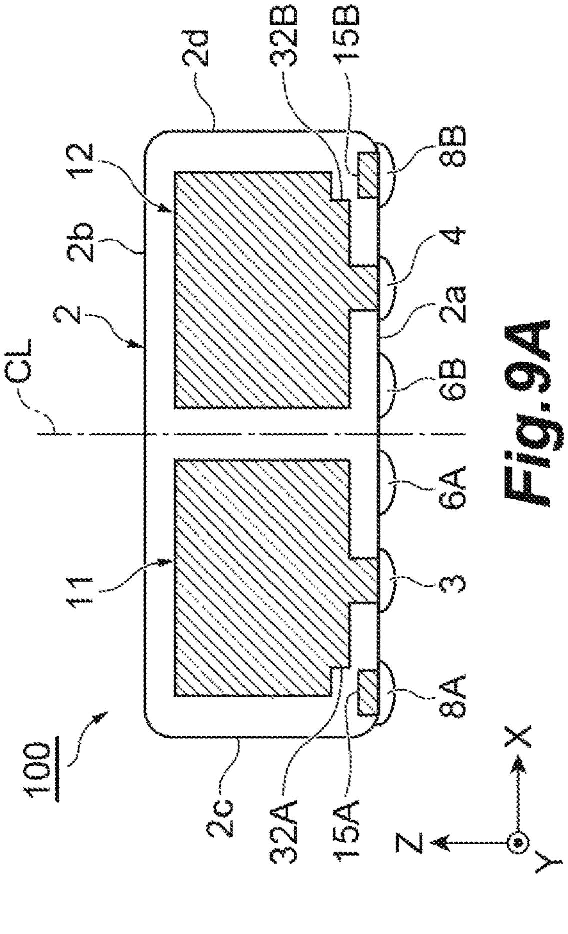
FIG. 9A, FIG. 9B, and FIG. 9C are diagrams showing an electronic component according to a modified example.
Figure 9B:
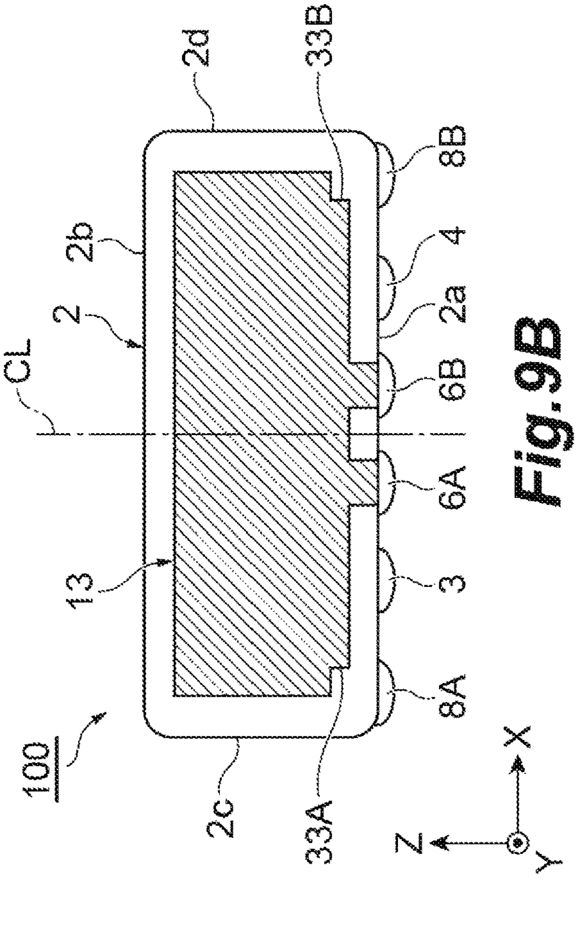
Figure 9C:
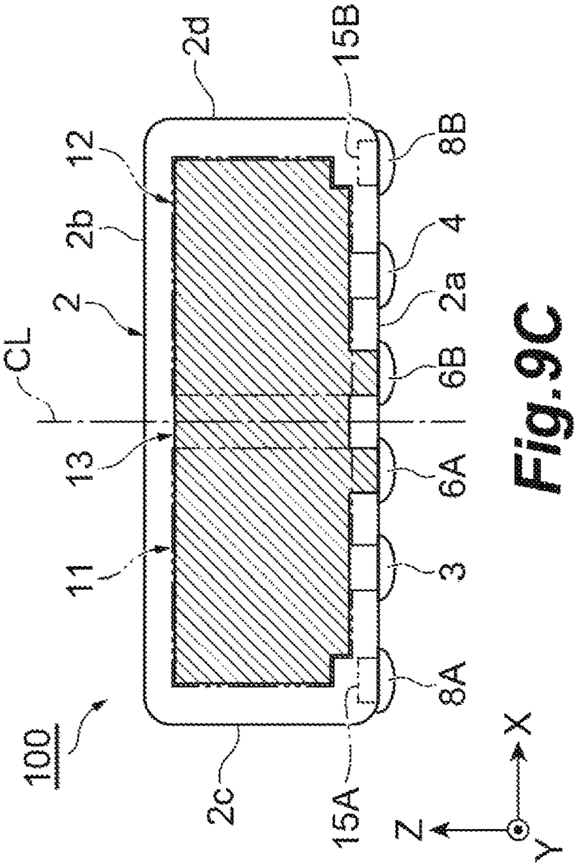

A configuration shown in FIGS. 9A, 9B and 9C may be adopted. As shown in FIG. 9A, the electronic component 100 may further include second external conductors 8A and 8B which are formed on the first main surface 2*a* and are arranged on the outside of the X-axis direction in relation to the first terminal electrode 3, the second terminal electrode 4, and the first external conductors 6A and 6B. In this case, it is possible to improve the bending and fixing strength between the terminal electrodes 3 and 4 by mounting the second external conductors 8A and 8B when mounting the electronic component 100.

Specifically, the second external conductor 8A, the first terminal electrode 3, the first external conductor 6A, the first external conductor 6B, the second terminal electrode 4, and the second external conductor 8B are formed on the first main surface 2*a* in order from the negative side to the positive side of the X-axis direction. Fifth internal electrodes 15A and 15B connected to the second external conductors 8A and 8B are formed at the positions of the second external conductors 8A and 8B inside the element body 2.

Further, the first internal electrode 11 and the second internal electrode 12 may include notch portions 32A and 32B at the corners on the outside of the X-axis direction on the side of the first main surface 2*a*. Further, as shown in FIG. 9B, the third internal electrode 13 may include notch portions 33A and 33B at the corners on the outside of the X-axis direction on the side of the first main surface 2*a*. In this case, since the notch portions 32A, 32B, 33A, and 33B avoid a crack even when a crack is generated in the vicinity of the corner of the element body 2, it is possible to prevent the crack from reaching the overlapping portion of the internal electrode forming the capacitor portions 10A and 10B (see FIG. 9C).

The shape of the element body 2 is not limited to the above-described embodiment and modified example. The element body 2 is not limited to a rectangular parallelepiped shape as long as the element body includes a pair of main surface, a pair of end surfaces, and a pair of side surfaces facing each other.

[Aspect 1] An electronic component including:

an element body which has a first main surface and a second main surface facing each other in a first direction, a first end surface and a second end surface facing each other in a second direction orthogonal to the first direction, and a first side surface and a second side surface facing each other in a third direction orthogonal to the first direction and the second direction;

a first internal electrode which is provided inside the element body and is drawn on the first main surface corresponding to a mounting surface;

a second internal electrode which is provided inside the element body, is provided at a position different from the first internal electrode when viewed from the third direction, and is drawn on the first main surface;

a first terminal electrode which is formed on the first main surface and is connected to the first internal electrode;

a second terminal electrode which is formed on the first end surface and is connected to the second internal electrode;

a third internal electrode which is provided inside the element body, is provided at a position facing the first internal electrode and the second internal electrode in the third direction, and is drawn on the first main surface; and a first external conductor which is formed on the first main surface and is connected to the third internal electrode, wherein the first internal electrode and the third internal electrode face each other in the third direction to form a first capacitor portion, and wherein the second internal electrode and the third internal electrode face each other in the third direction to form a second capacitor portion.

[Aspect 2] The electronic component according to Aspect 1, wherein a plurality of the first external conductors are provided, and wherein the first terminal electrode and the second terminal electrode are arranged between the plurality of first external conductors.

[Aspect 3] The electronic component according to Aspect 1 or 2, wherein a plurality of the first external conductors are provided, and wherein the plurality of first external conductors are arranged between the first terminal electrode and the second terminal electrode.

[Aspect 4] The electronic component according to any one of Aspects 1 to 3, wherein at least one of the first internal electrode, the second internal electrode, and the third internal electrode includes a notch portion at a corner on an outside of the second direction on a side of the first main surface.

[Aspect 5] The electronic component according to any one of Aspects 1 to 4, wherein at least one of the first terminal electrode, the second terminal electrode, and the first external conductor is disposed at a corner between the end surface and the first main surface of the element body.

[Aspect 6] The electronic component according to any one of Aspects 1 to 5, further including:

a second external conductor which is formed on the first main surface and is disposed on an outside of the second direction in relation to the first terminal electrode, the second terminal electrode, and the first external conductor.

[Aspect 7] The electronic component according to any one of Aspects 1 to 6, further including:

a pair of the third internal electrodes;

a pair of the first external conductors connected to the pair of third internal electrodes; and a fourth internal electrode which is provided inside the element body and is provided at a position different from the first internal electrode and the second internal electrode when viewed from the third direction, wherein the first internal electrode and one third internal electrode face each other in the third direction to form the first capacitor portion, wherein the second internal electrode and the other third internal electrode face each other in the third direction to form the second capacitor portion, wherein the fourth internal electrode and one third internal electrode face each other in the third direction to form a third capacitor portion, and wherein the fourth internal electrode and the other third internal electrode face each other in the third direction to form a fourth capacitor portion.

[Aspect 8] The electronic component according to Aspect 7, further including:

a third external conductor which is connected to the fourth internal electrode.

[Aspect 9] The electronic component according to Aspect 8, wherein the third external conductor is formed on the first main surface.

[Aspect 10] The electronic component according to Aspect 8, wherein the third external conductor is formed on the second main surface.

EXPLANATION OF REFERENCE

2 Element body
**2*a*** First main surface
**2*b*** Second main surface
**2*c*** First end surface
**2*d*** Second end surface
**2*e*** First side surface
**2*f*** Second side surface
3 First terminal electrode
4 Second terminal electrode
6A, 6B First external conductor
7 Third external conductor
8A, 8B Second external conductor
10A First capacitor portion
10B Second capacitor portion
10C Third capacitor portion
10D Fourth capacitor portion
11 First internal electrode
12 Second internal electrode
13 Third internal electrode
14 Fourth internal electrode
100 Electronic component

What is claimed is:

1. An electronic component comprising:
an element body which has a first main surface and a second main surface facing each other in a first direction, a first end surface and a second end surface facing each other in a second direction orthogonal to the first direction, and a first side surface and a second side surface facing each other in a third direction orthogonal to the first direction and the second direction;
a first internal electrode which is provided inside the element body and is drawn on the first main surface corresponding to a mounting surface;
a second internal electrode which is provided inside the element body, is provided at a position different from the first internal electrode when viewed from the third direction, and is drawn on the first main surface;
a first terminal electrode which is formed on the first main surface and is connected to the first internal electrode;
a second terminal electrode which is formed on the first main surface and is connected to the second internal electrode;
a third internal electrode which is provided inside the element body, is provided at a position facing the first internal electrode and the second internal electrode in the third direction, and is drawn on the first main surface; and
a first external conductor which is formed on the first main surface and is connected to the third internal electrode,
wherein the first internal electrode and the third internal electrode face each other in the third direction to form a first capacitor portion,
the second internal electrode and the third internal electrode face each other in the third direction to form a second capacitor portion,
a plurality of the first external conductors is provided,
the first terminal electrode and the second terminal electrode are arranged between the plurality of first external conductors, and
the first terminal electrode and the second terminal electrode are adjacent to each other in the second direction.

2. The electronic component according to claim 1, further comprising:
a second external conductor which is formed on the first main surface and is disposed on an outside of the second direction in relation to the first terminal electrode, the second terminal electrode, and the first external conductor.

3. The electronic component according to claim 1, further comprising:
a pair of the third internal electrodes;
a pair of the first external conductors connected to the pair of third internal electrodes; and
a fourth internal electrode which is provided inside the element body and is provided at a position different from the first internal electrode and the second internal electrode when viewed from the third direction,
wherein the first internal electrode and one third internal electrode face each other in the third direction to form the first capacitor portion,
wherein the second internal electrode and the other third internal electrode face each other in the third direction to form the second capacitor portion,
wherein the fourth internal electrode and the one third internal electrode face each other in the third direction to form a third capacitor portion, and
wherein the fourth internal electrode and the other third internal electrode face each other in the third direction to form a fourth capacitor portion.

4. The electronic component according to claim 1, wherein the third internal electrode includes a first region facing the first internal electrode in the third direction, and a second region facing the second internal electrode in the third direction and connected to the first region.

5. The electronic component according to claim 1, wherein the first terminal electrode, the second terminal electrode and the plurality of the first external conductors are arranged at different positions in the second direction when viewed in the third direction.

6. The electronic component according to claim 3, further comprising:
a third external conductor which is connected to the fourth internal electrode.

7. The electronic component according to claim 6,
wherein the third external conductor is formed on the second main surface.

8. An electronic component comprising:
an element body which has a first main surface and a second main surface facing each other in a first direction, a first end surface and a second end surface facing each other in a second direction orthogonal to the first direction, and a first side surface and a second side surface facing each other in a third direction orthogonal to the first direction and the second direction;
a first internal electrode which is provided inside the element body and is drawn on the first main surface corresponding to a mounting surface;
a second internal electrode which is provided inside the element body, is provided at a position different from the first internal electrode when viewed from the third direction, and is drawn on the first main surface;
a first terminal electrode which is formed on the first main surface and is connected to the first internal electrode;
a second terminal electrode which is formed on the first main surface and is connected to the second internal electrode;
a third internal electrode which is provided inside the element body, is provided at a position facing the first internal electrode and the second internal electrode in the third direction, and is drawn on the first main surface; and a first external conductor which is formed on the first main surface and is connected to the third internal electrode, wherein the first internal electrode and the third internal electrode face each other in the third direction to form a first capacitor portion, the second internal electrode and the third internal electrode face each other in the third direction to form a second capacitor portion, a plurality of the first external conductors is provided, the plurality of first external conductors is arranged between the first terminal electrode and the second terminal electrode, the first external conductors are adjacent to each other in the second direction, and the third internal electrode includes:

a first region facing the first internal electrode in the third direction;

a second region facing the second internal electrode in the third direction and coupled to the first region; and a plurality of lead-out portions connecting the first region and the second region to a corresponding one of the plurality of first external conductors.

9. The electronic component according to claim 8, wherein the first terminal electrode, the second terminal electrode and the plurality of first external conductors are arranged at different positions in the second direction when viewed in the third direction.

10. The electronic component according to claim 8, further comprising:

a second external conductor which is formed on the first main surface and is disposed on an outside of the second direction in relation to the first terminal electrode, the second terminal electrode, and the first external conductor.

11. An electronic component comprising:

an element body which has a first main surface and a second main surface facing each other in a first direction, a first end surface and a second end surface facing each other in a second direction orthogonal to the first direction, and a first side surface and a second side surface facing each other in a third direction orthogonal to the first direction and the second direction;

a first internal electrode which is provided inside the element body and is drawn on the first main surface corresponding to a mounting surface;

a second internal electrode which is provided inside the element body, is provided at a position different from the first internal electrode when viewed from the third direction, and is drawn on the first main surface;

a first terminal electrode which is formed on the first main surface and is connected to the first internal electrode;

a second terminal electrode which is formed on the first main surface and is connected to the second internal electrode;

a third internal electrode which is provided inside the element body, is provided at a position facing the first internal electrode and the second internal electrode in the third direction, and is drawn on the first main surface; and a first external conductor which is formed on the first main surface and is connected to the third internal electrode, wherein the first internal electrode and the third internal electrode face each other in the third direction to form a first capacitor portion, the second internal electrode and the third internal electrode face each other in the third direction to form a second capacitor portion, at least one of the first internal electrode, the second internal electrode, and the third internal electrode includes a notch portion at a corner on an outside of the second direction on a side of the first main surface, and the notch portion is inclined with respect to the second direction and has a gradient that increases toward the first end surface or the second end surface when viewed from the third direction.

12. An electronic component comprising:

an element body which has a first main surface and a second main surface facing each other in a first direction, a first end surface and a second end surface facing each other in a second direction orthogonal to the first direction, and a first side surface and a second side surface facing each other in a third direction orthogonal to the first direction and the second direction;

a first internal electrode which is provided inside the element body and is drawn on the first main surface corresponding to a mounting surface;

a second internal electrode which is provided inside the element body, is provided at a position different from the first internal electrode when viewed from the third direction, and is drawn on the first main surface;

a first terminal electrode which is formed on the first main surface and is connected to the first internal electrode;

a second terminal electrode which is formed on the first main surface and is connected to the second internal electrode;

a third internal electrode which is provided inside the element body, is provided at a position facing the first internal electrode and the second internal electrode in the third direction, and is drawn on the first main surface; and a first external conductor which is formed on the first main surface and is connected to the third internal electrode, wherein the first internal electrode and the third internal electrode face each other in the third direction to form a first capacitor portion, the second internal electrode and the third internal electrode face each other in the third direction to form a second capacitor portion, at least one of the first terminal electrode, the second terminal electrode, and the first external conductor includes a lead-out portion that is disposed at a corner between the first end surface and the first main surface of the element body, and the lead-out portion is inclined with respect to the second direction and has a gradient that decreases toward the corner when viewed from the third direction.

* * * * *